US012710315B2

(12) United States Patent
Peng et al.

(10) Patent No.: US 12,710,315 B2
(45) Date of Patent: Aug. 18, 2026

(54) LIGHT FIXTURE HAVING MULTI-TARGET TEMPERATURE DETECTION CIRCUIT

(71) Applicant: Guangzhou Haoyang Electronic Co., Ltd., Guangzhou (CN)

(72) Inventors: Yingru Peng, Guangzhou (CN); Weikai Jiang, Guangzhou (CN); Hui Luo, Guangzhou (CN)

(73) Assignee: Guangzhou Haoyang Electronic Co., Ltd., Guangzhou (CN)

( * ) Notice: Subject to any disclaimer, the term of this patent is extended or adjusted under 35 U.S.C. 154(b) by 504 days.

(21) Appl. No.: 18/325,456

(22) Filed: May 30, 2023

(65) Prior Publication Data

US 2024/0175755 A1 May 30, 2024

(30) Foreign Application Priority Data

Nov. 30, 2022 (CN) ......................... 202223233664.1

(51) Int. Cl.
*G01J 5/10* (2006.01)

(52) U.S. Cl.
CPC ....................................... *G01J 5/10* (2013.01)

(58) Field of Classification Search
CPC ................ Y02B 20/40; G01J 5/10; G01J 5/48
USPC ........................................................... 374/121
See application file for complete search history.

(56) References Cited

U.S. PATENT DOCUMENTS

2015/0285483 A1* 10/2015 Kjaer ...................... F21V 21/15 362/373
2020/0314974 A1* 10/2020 Thurk ................ H05B 45/3577
2021/0134238 A1* 5/2021 Zhang .................. G09G 3/3688

FOREIGN PATENT DOCUMENTS

CN 213028624 * 4/2021
CN 216450063 * 5/2022 ........... G06F 15/163

OTHER PUBLICATIONS

Analog Device LTC2986 data sheet (Year: 2016).*
SGM452 temperature sensor data sheet (Year: 2022).*
STM32 data sheet (Year: 2020).*
Texas Instruments Application Note a Basic Guide to 12C (Year: 2022).*

* cited by examiner

*Primary Examiner* — Kristina M Deherrera
(74) *Attorney, Agent, or Firm* — MUNCY, GEISSLER, OLDS & LOWE, P.C.

(57) ABSTRACT

A light fixture having a multi-target temperature detection circuit includes a light source assembly for generating a light path, a light outgoing lens, a plurality of temperature-controlled elements inside the light head of the light fixture, and at least one heat dissipation assembly for dissipating heat from the temperature-controlled elements. A single-chip microcomputer and a plurality of temperature sensors located at various positions inside the light head are included. The single-chip microcomputer is connected to, via an integrated communication serial port, the plurality of temperature sensors connected in parallel and send corresponding address signals and temperature detection signals to the single-chip microcomputer via the integrated communication serial port, and the single-chip microcomputer receives and processes the plurality of temperature detection signals.

14 Claims, 4 Drawing Sheets

LIGHT FIXTURE HAVING MULTI-TARGET TEMPERATURE DETECTION CIRCUIT

CROSS REFERENCE TO RELATED APPLICATIONS

The present application claims priorities from Chinese Application No. CN 202223233664.1 filed on Nov. 30, 2022, all of which are hereby incorporated herein by reference.

TECHNICAL FIELD

The present disclosure relates to the field of light fixtures, in particular to a light fixture having a multi-target temperature detection circuit.

BACKGROUND

With development in the field of light fixtures, such as stage light fixtures or architectural light fixtures, components in the light fixtures have been increasing, among which many components will continuously generate heat when powered on for use, such as the light-emitting element, the MOS transistor, the PCB. In order to prevent the risk of burning out the circuit caused by overheat of the components in the circuit, the requirements for heat dissipation in the light fixtures are becoming increasingly high. Accordingly, it has been a great focus to research efficient heat dissipation systems and economical heat dissipation methods in the industry of light fixtures. However, the basis for study on heat dissipation is to detect the range of temperature rise, the cause of the temperature rise, and the specific location of the heat sources. Especially, for the high-power light source modules of the light fixtures, when studying on the location of the heat source, the heat source in the light fixture continuously generating heat can be determined by a temperature detection circuit, in such way, the heat source continuously generating heat with a significant temperature rise change can be cooled down, thus ensuring efficient and high-performance heat dissipation in the light fixture product.

As known, an NTC (Negative Temperature Coefficient) circuit is generally subjected to temperature detection in the light fixture, each heat-generating component in the NTC circuit is connected to a thermosensitive unit, and all the thermosensitive units are connected to a single-chip microcomputer, such a connection method can ensure that the single-chip microcomputer accurately determines the specific location of the heat-generating components. However, it is required for such circuit to occupy a large number of ADC (analog-to-digital converter) serial ports of the single-chip microcomputer, making the single-chip microcomputer able to accurately determine the address of each heat-generating component. Although the connection design of the circuit is simple, as the wiring serial ports of the single-chip microcomputer is of a fixed number, and with the increasing demand for multi-functional light fixtures in the market, enormous effect modules or other functional components are included in the light fixture, so that the heat-generating components to be detected for the temperature rise change will also correspondingly become more, resulting in requirement for adding a plurality of single-chip microcomputers to complete the temperature detection of the light fixture, which undoubtedly in turn increases the number of single-chip microcomputers and increases the cost of the circuit for performing temperature detection on the light fixture.

Therefore, there is an urgent demand to reduce the cost of the temperature detection circuit, the number of single-chip microcomputers, and the occupation of serial ports of the single-chip microcomputers as much as possible, especially in a case of the design of complex and multi-serial light fixtures.

SUMMARY

The present disclosure thus provides a light fixture having a multi-target temperature detection circuit, which can reduce the number of serial ports of a single-chip microcomputer of a temperature detection circuit in a complex multi-serial light fixture circuit.

The light fixture according to the present disclosure has a light head, the light head includes a light source assembly for generating a light path, a light outgoing lens, a plurality of temperature-controlled elements disposed inside the light head, and at least one heat dissipation assembly for dissipating heat from the temperature-controlled elements. The light fixture further includes a single-chip microcomputer and a plurality of temperature sensors located at various positions within the light head. The single-chip microcomputer is connected to, via at least one integrated communication serial port, the plurality of temperature sensors are connected in parallel and configured to send corresponding address signals and temperature detection signals thereof to the single-chip microcomputer via the integrated communication serial port, and the single-chip microcomputer serves to receive and process the plurality of temperature detection signals.

According to a preferable embodiment, the integrated communication serial port is in form of an I2C serial port. Such configuration is beneficial to connect a plurality of components to the same I2C bus via the I2C serial port and it is beneficial to decide which host controls the bus by I2C via bus arbitration.

Each of the temperature sensors includes a thermosensitive unit and an analog-to-digital converter (ADC). The thermosensitive unit is used for detecting the temperature of the respective temperature-controlled element, the analog-to-digital converter (ADC) is used for converting the temperature change into a digital analog signal, the converted digital analog signal is output to the single-chip microcomputer via the I2C serial port. With such easy way, analog signal of the temperature change detected by the temperature sensor is converted into a digital signal, and the digital signal is transmitted to the single-chip microcomputer for processing.

At least three jumper resistors connected to each temperature sensor may be further included for distinguishing address information of the respective temperature sensors. With the jumper resistors, one temperature sensor can obtain address information distinguishing same from the other temperature sensors, so that the single-chip microcomputer can accurately determine the position of each of the temperature sensors, thereby achieving accurate heat dissipation.

As an infrared probe has the advantages of low power consumption and low cost, which is beneficial to reduce the temperature detection cost of the light fixture, each of the temperature sensors in the present disclosure may include an infrared probe arranged close to the respective temperature-controlled element.

At least one temperature sensor is preferably in form of an SGM452 temperature sensor. It is beneficial to improve the resolution of the temperature sensor, i.e., the SGM452 temperature sensor is able to capture, distinguish and output signals when the temperature change in the light fixture is very tiny.

In order to expand the application scenarios of the temperature sensor of the temperature detection circuit, especially to adapt to extreme scenarios, each temperature sensor is designed to have a temperature detection range of −55° ° C. to 125° C.

The temperature-controlled elements may be at least one of an MOS transistor, a light source driving board of the light source assembly, a PCB of the effect module, or a PCB of a focusing lens. When the light fixture is in an operating state, these components will generate a large amount of heat, however, the temperature detection circuit provided can rapidly detect the temperature change of such temperature-controlled element with the most heat generated in the light fixture, thereby preventing these main components from damage due to overhigh temperature, and thus prolonging the service life of the circuit.

The light source assembly may include a light source driving board, and at least one temperature sensor is closely attached to the light source driving board for detecting an overall temperature change thereof. With such a configuration, a heat-generating point where the temperature change is abnormal can be quickly found through the change of the overall temperature, which can reduce the number of the temperature sensors arranged on the circuit.

According to another embodiment, the light source assembly may include a plurality of light source driving boards provided with light-emitting elements, and each of the light source driving boards is provided with at least one temperature sensor, especially in a close attachment way. Due to such a configuration, the temperature change of each light source driving board can be individually detected, facilitating accurate temperature control; at the same time. Due to the configuration of close attachment, it is beneficial to dispose the temperature sensor and the light source driving board with the most obvious temperature change together to shorten the reaction time of the temperature sensor and improve the efficiency of the temperature detection circuit.

The plurality of light source driving boards are respectively provided with a heat dissipation assembly, and the single-chip microcomputer receives a plurality of temperature detection signals and is used for controlling the working state of each heat dissipation assembly. Such configuration facilitates cooling the temperature of the temperature-controlled elements to maintain the temperature on the circuit constant, and thus extend the service life of the light source driving board.

The heat dissipation assembly may include an air blower. The heat dissipation rate of the heat dissipation assembly is further increased by the air blower to promote circulation of air in the vicinity of the temperature-controlled elements.

The light fixture further includes a case and a support arm pivotally connected to the case. The light head is pivotally connected to the inner side of the support arm, so that the light head can rotate in two dimensions with respect to the case. It is beneficial to achieve light effects at multiple angles with the light head in pivot connection with the case and the support arm.

According to the present disclosure, the occupation of serial ports of single-chip microcomputers can be reduced by connecting the temperature sensors into the multi-target temperature detection circuit of the light fixture, thereby achieving the effects of reducing the number of the single-chip microcomputers and thus reducing the cost of the temperature detection circuit.

DETAILED DESCRIPTION

Figure 1:
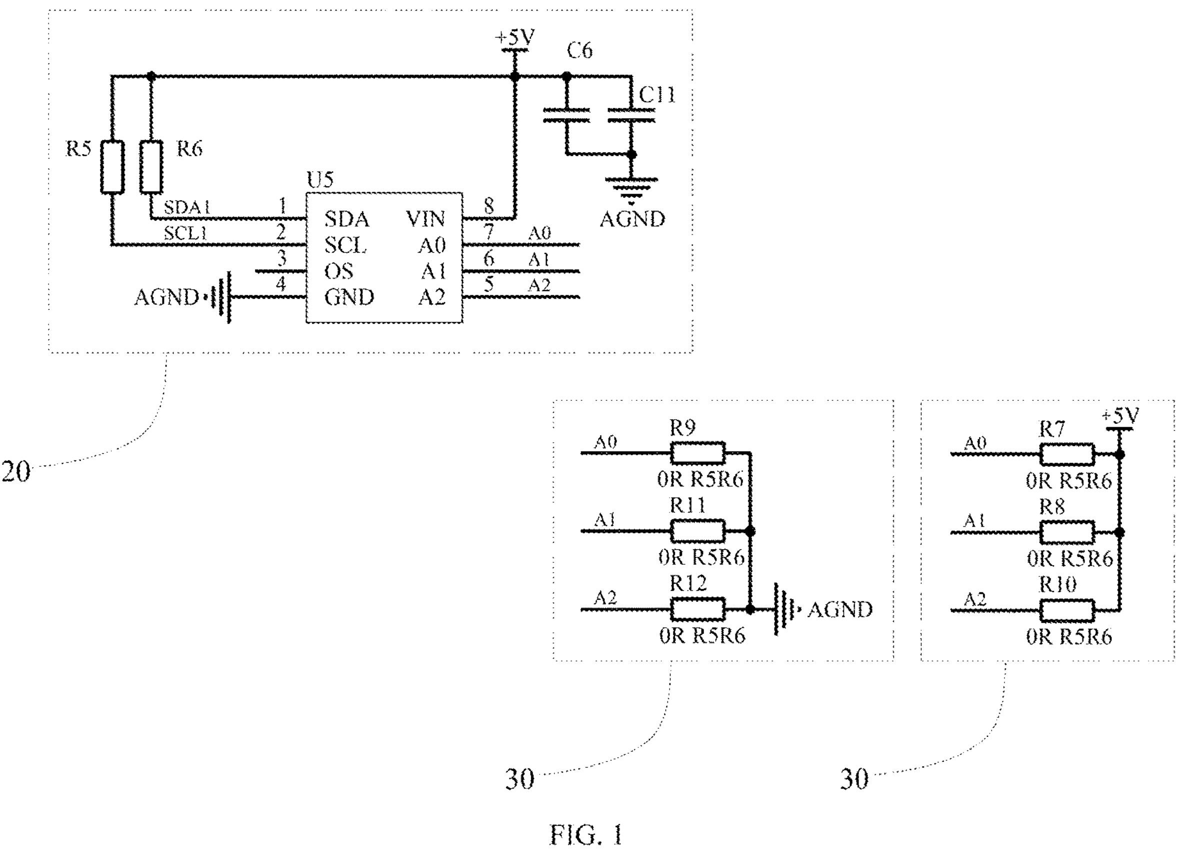
FIG. 1 is a schematic structural diagram of a circuit where temperature sensors include a plurality of jumper resistors according to an embodiment of the present disclosure.

The accompanying drawings are for exemplary illustration only, and should not be construed as limitations on the present disclosure. In order to better illustrate the following embodiment, some parts in the accompanying drawings may be omitted, enlarged or reduced, and they do not represent the size of the actual product; for those skilled in the art, it is understandable that certain well-known assemblies and descriptions thereof in the drawings may be omitted.

Figure 3:
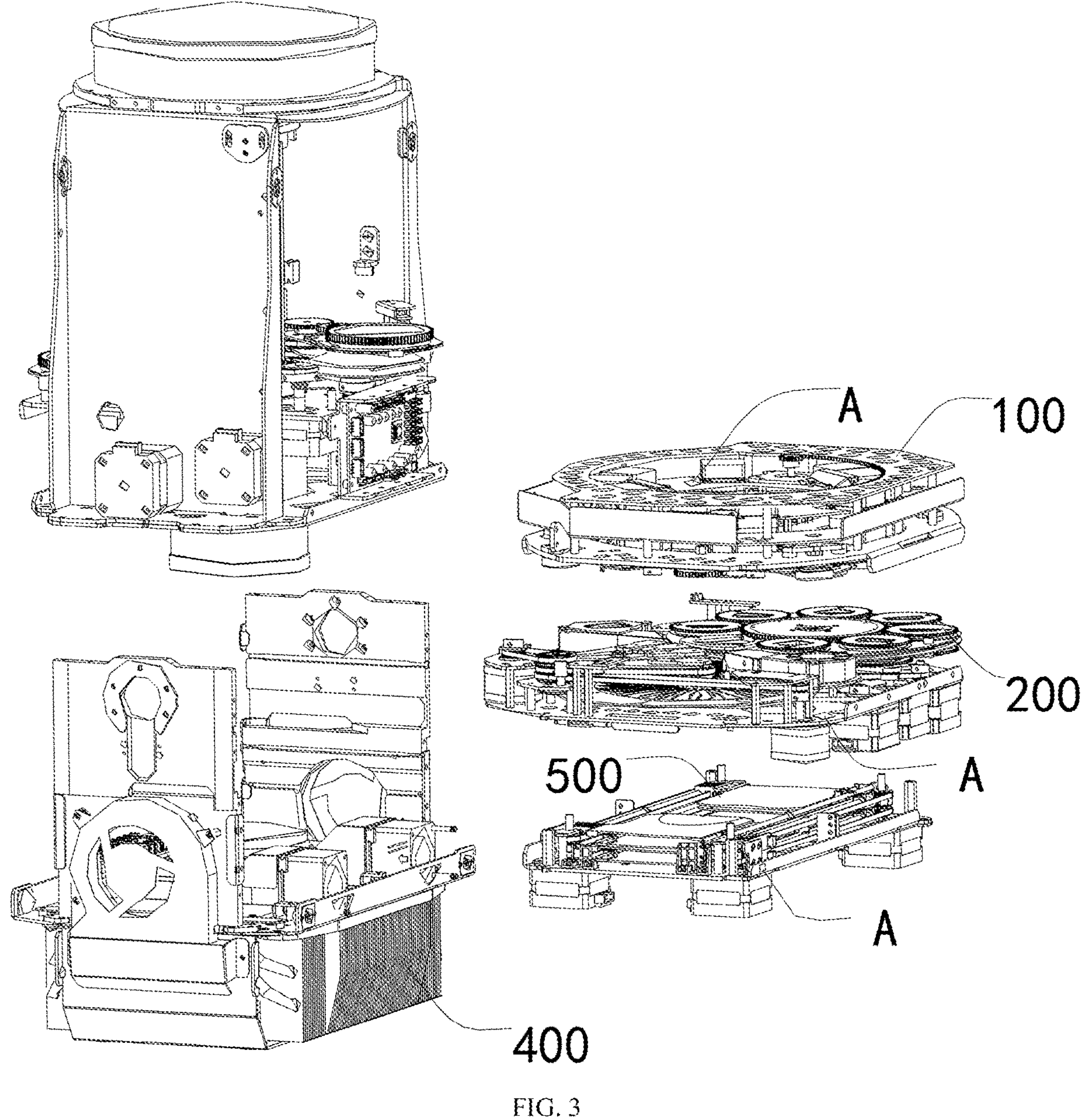
FIG. 3 is a schematic diagram of an exploded structure of a light fixture according to another embodiment according to the present disclosure.
Figure 4:
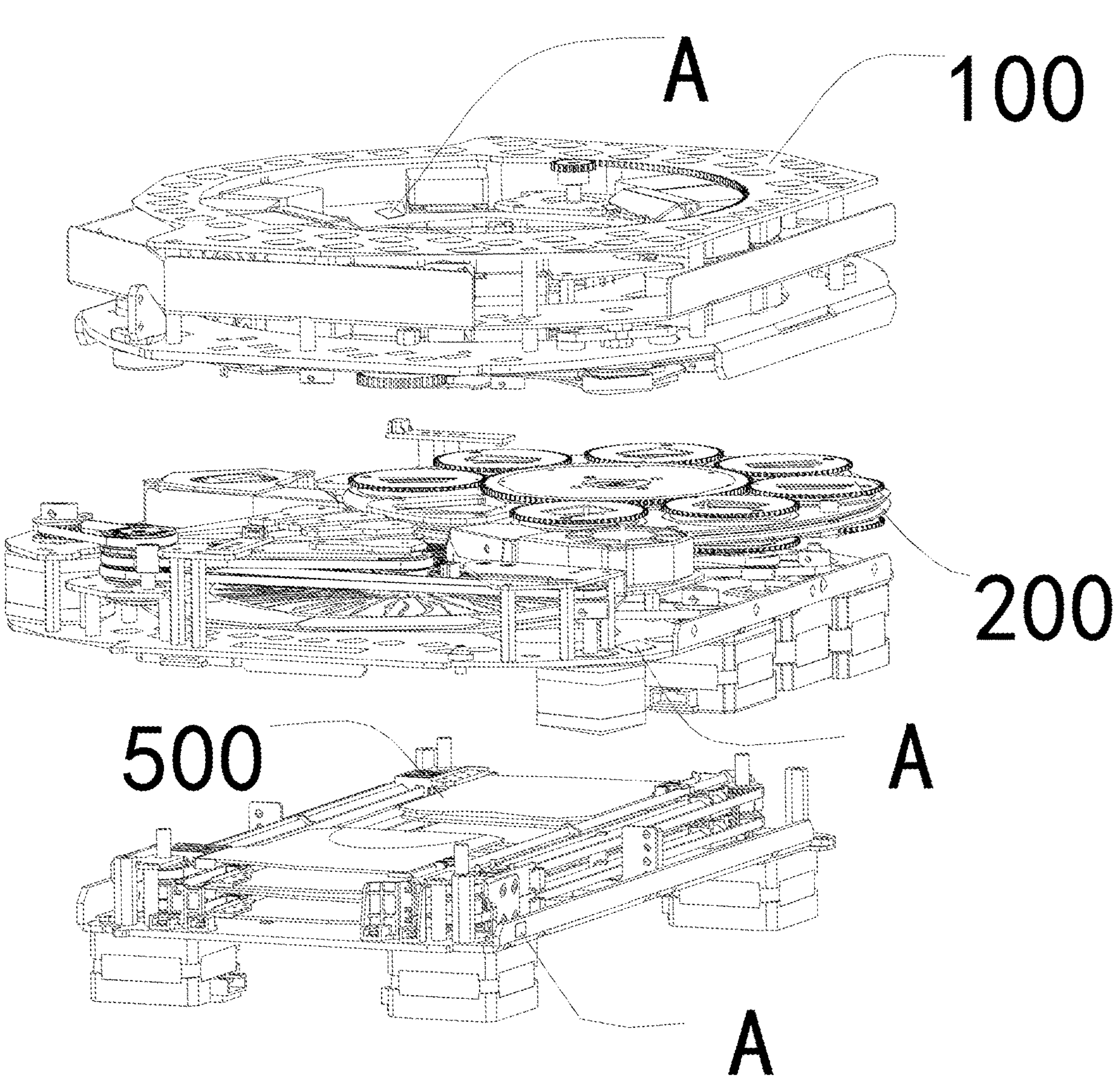
FIG. 4 is an enlarged schematic diagram showing a preferred placement position of a temperature sensor in the light fixture of FIG. 3.

Referring to FIG. 3 and FIG. 4, the light fixture having a multi-target temperature detection circuit of the present disclosure is exampled as a stage light fixture according to one embodiment, the reference numeral A in the FIGS. 3-4 refers to a preferred placement position of a temperature sensor. The stage light fixture in the present embodiment has a light head, which light head includes a light source assembly for generating a light path, a light outgoing lens, a plurality of temperature-controlled elements inside the light head, and at least one heat dissipation assembly for dissipating heat from the temperature-controlled elements. The stage light fixture further includes a single-chip microcomputer and a plurality of temperature sensors located at various positions within the light head. The temperature-controlled elements are configured to be temperature-controlled. The single-chip microcomputer is connected to, via at least one integrated communication serial port, the plurality of temperature sensors are connected in parallel and configured to send corresponding address signals and temperature detection signals thereof to the single-chip microcomputer via the integrated communication serial port, and the single-chip microcomputer serves to receive and process the plurality of temperature detection signals. In this embodiment, the plurality of temperature sensors 20 are adapted for sensing and collecting the temperature rise changes of the plurality of temperature-controlled elements in the light fixture, and the single-chip microcomputer is used for performing analysis according to signals sent by the temperature sensors 20 to determine the specific positions of the temperature-controlled elements where the temperature rise changes occur. The integrated communication serial port is disposed in the single-chip microcomputer. The temperature sensor 20 is connected to the single-chip microcomputer via the integrated communication serial port, and the temperature sensor 20 converts the collected temperature rise changes of the plurality of temperature-controlled elements into signals and sends same to the single-chip microcomputer.

More specifically, two PINs of the single-chip microcomputer are connected to the integrated communication serial port, which can connect eight temperature sensors in parallel with each other, thus achieving that the temperature of eight different positions can be detected simultaneously.

As shown in FIG. 1, the integrated communication serial port in this embodiment is in form of an I2C serial port. The single-chip microcomputer in this embodiment is connected to an I2C bus through the integrated communication serial port. The I2C bus is a multi-way control bus, i.e., a plurality of chips can be connected under the same bus structure, and each chip can serve as a control source for real-time data transmission. Usually, an I2C serial bus has two signal lines, one single line is a bidirectional data line SDA and the other signal line is a clock line SCL, all the serial data SDA connected to an I2C bus device are connected to the SDA of the bus, and the clock line SCL of each device is connected to the SCL of the bus.

As shown in FIG. 1, each temperature sensor 20 in this embodiment includes a thermosensitive unit and an analog-to-digital converter. The physical properties of the thermosensitive unit change with the temperature, and the thermosensitive unit in this embodiment has the feature that the resistance value decreases with the increase of temperature, and can also protect and give an alarm to the circuit due to the electrical surge characteristic under a certain temperature. The temperature change acquired by the thermosensitive unit is an analog signal, and the analog-to-digital converter samples the analog signal input by the thermosensitive unit at a specified time interval and compares same with a series of standard digital signals, the digital signal converges successively until the two signals are equal, and then a binary number representing the signal is displayed to complete the conversion from the analog signal to the digital signal. Then the analog-to-digital converter outputs the digital signal to the single-chip microcomputer via the integrated communication serial port. To this end, the single-chip microcomputer obtains an input of the signal of the temperature change collected by the temperature sensor 20.

At least one of the temperature sensors in this embodiment is in a model of an SGM452 temperature sensor, which has a resolution of up to 12 bit. In general, the resolution of the temperature sensor refers to the ability to capture the minimum change value of the measured temperature-controlled elements. That is, if the input amount of the temperature value changes slowly from a certain non-zero value, the output of the temperature sensor 20 does not change when the input change value of the temperature value does not exceed a certain value set by the temperature sensor, i.e., the change of the input amount of the temperature value is indistinguishable for the temperature sensor 20, and the output of the temperature sensor 20 changes only when the change of the input amount of the temperature value exceeds the resolution. Therefore, due to the resolution, up to 12 bit, of the temperature sensor 20 in this embodiment, the ability to capture the minimum value of the temperature rise change of the temperature-controlled elements becomes higher, compared with other temperature sensors such as model LM75A, effective bits of such temperature sensor increase by 3 bit, showing that the resolution, referring to the ability to capture the minimum value of the temperature rise change of the temperature-controlled elements, increases.

In this embodiment, the SGM452 temperature sensor includes a number of data registers, including a pointer register, used for addressing operands of a plurality of memories, which facilitates accessing storage units in different address forms; a configuration register, used for storing certain configurations of devices and setting operating conditions of the devices; a temperature register, used for storing read digital temperature data; an overheat shutdown threshold register, used for saving an overheat shutdown limit value; and a hysteresis register, used for saving a hysteresis limit value. In this embodiment, the SGM452 temperature sensor also includes an open-drain output (OS), and the output is effective when the temperature exceeds a limited value in the programming. The SGM452 temperature sensor has three optional logical address pins so that eight devices can be connected simultaneously to the same bus without address conflicts. The SGM452 temperature sensor according to the present embodiment has pins of SDA, SCL, OS, GND, VCC, A2, A1 and A0, wherein SDA is a digital I/O port for connecting an I2C serial bidirectional data line; SCL is a digital input port for connecting an I2C serial clock input; OS is an overheat shutdown output port; GND is ground port, connected to the system ground; VCC is a power supply port; A2 is a digital input port and is a user-defined address bit 2; A1 is a digital input port and is a user-defined address bit 1; A0 is a digital input port and is a user-defined address bit 0. Accordingly, up to eight SGM452 temperature sensors can be used simultaneously on one I2C bus.

More specifically, the temperature sensor 20 further includes six of the jumper resistors 30, R7, R8, R9, R10, R11 and R12, wherein R7, R8 and R10 are a first group of jumper resistors connected in parallel with each other for access to a voltage of 5V, and R9, R11 and R12 are a second group of jumper resistors connected in parallel with each other and connected to a ground wire, namely, the voltage value thereof is 0V. When A0, A1 and A2 of one temperature sensor SGM452 respectively select access to the first group of jumper resistors or the second group of jumper resistors to obtain different bit numbers (1 or 0), address information distinguishing same from other temperature sensors can be finally obtained, by way of example, when A0 is connected to R7, A1 is connected to R11, and A2 is connected to R10, the position information about the temperature sensor is obtained as "101", such position signal is transmitted to the single-chip microcomputer, so that the single-chip microcomputer can read the accurate position of the temperature sensor 20 in the light fixture, which facilitates accurate cooling of the detected position of the temperature sensor. However, in other embodiments, corresponding number of groups of the jumper resistors 30 can be selected according to the number of the temperature sensors 10, or the jumper resistors 30 can also be replaced with jumper caps.

According to this embodiment, as the light fixture is used in a wide range of scenarios, correspondingly, the temperature detection circuit used for the light fixture is required to adapt to variable scenarios as well. To illustrate, when the light fixture is used outdoors, the temperature detection circuit has to be able to adapt to variable external temperatures such as −40° ° C. in the extremely cold region, Mohe, or 50° C. in the extremely hot region, Turpan in China, and also to work normally in the light fixture continuously generating heat, adapting to the temperature change of the components continuously generating heat. Therefore, the temperature sensor preferably is designed to have a temperature detection range of −55° ° C. to 125° C. which can greatly improve the wide application of the temperature sensor.

In this embodiment, the temperature-controlled elements of the light fixture can include an MOS transistor, and can also include a light source driving board 10 in the light source assembly or a PCB of an effect module or a PCB of a focusing lens. In this case, the MOS transistor may generate heat due to losses caused by the equivalent DC impedance and voltage drop during operation, and heat may be accumulated on the PCB due to the lack of heat dissipation by airflow on the board. The temperature-controlled elements in the temperature detection circuit of the light fixture may therefore generate heat due to various reasons and the temperature sensors 20 are thus required to detect the temperature change of the temperature-controlled elements via the temperature detection circuit.

More specifically, the effect module may be a CMY assembly 500, a shading assembly 100, a gobo assembly 200, a color filter assembly, a frosting assembly, or a prism assembly. Since the motor of the effect module generates a large amount of heat when working, with the temperature sensor 20 close to the motor of the effect module, it is beneficial to cool down the effect module in time to prevent it from burning out due to overhigh temperature thereof.

In this embodiment, the temperature sensor 20 can be pasted to the light source driving board 10 by any known connection way, such as by double-sided adhesive. As known, the light source driving board 10 has a larger temperature change compared to other assemblies, in such configuration, when the temperature of a certain device on the light source driving board 10 is too high, the temperature sensor 20 can detect the overall temperature change of the light source driving board 10, thereby alerting the user to quickly determine the position of the temperature rise.

In this embodiment, the light source assembly may include a plurality of light source driving boards 10, each light source driving board 10 is also provided with light-emitting elements. In order to help the user to quickly determine the position of the temperature rise of the light source assembly while saving the temperature sensor 20 as much as possible, at least one of the temperature sensors 20 can be disposed on each light source driving board 10. With the plurality of temperature sensors 20, the position of the temperature rise can be determined more accurately, but the cost of the temperature detection circuit will be increased correspondingly, due to higher numbers of the temperature sensors 20.

The light source driving board 10 may be provided with a heat dissipation assembly 400, the start and stop of the heat dissipation assembly 400 is controlled by the single-chip microcomputer. An instruction for the single-chip microcomputer to send out signals is made according to the received temperature detection signal, when the single-chip microcomputer receives a detection signal, indicating that the temperature is overhigh, transmitted by the temperature sensor 20, the heat dissipation assembly 400 near the heat generating position is immediately started to help the light source driving board 10 with the abnormal temperature rise to maintain a normal temperature. Therefore, the heat dissipation assembly 400 can effectively extend the service life of the light source driving board and thus reduce the cost of using the light source driving board 10.

According to one embodiment, the heat dissipation assembly 400 has various forms of heat dissipation, including but not limited to an air blower, which can enhance the heat dissipation efficiency of the heat dissipation assembly by speeding up the air flow near the heat dissipation assembly, thereby increasing the heat exchange rate between the heat dissipation assembly and air.

Figure 2:
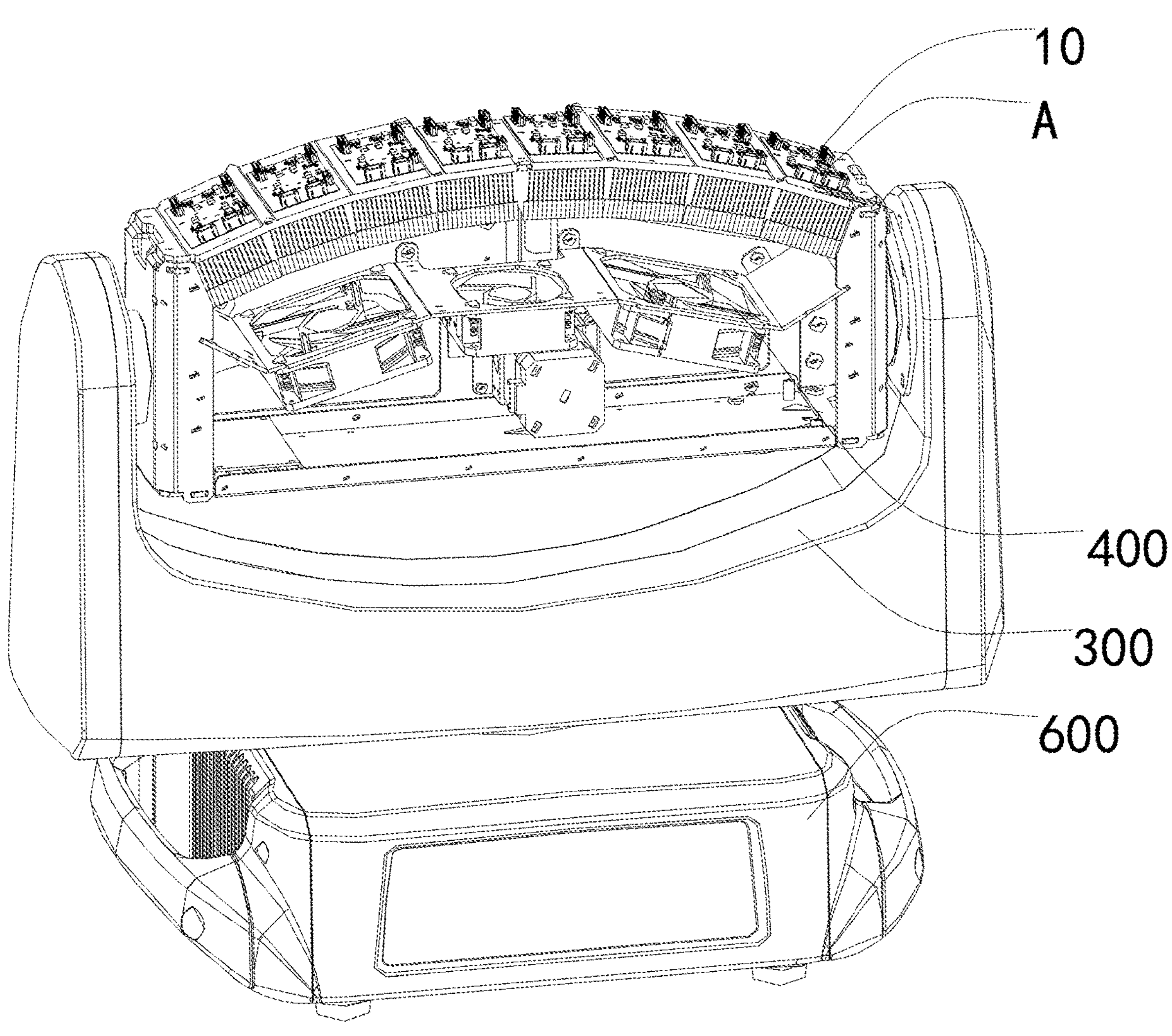
FIG. 2 is a schematic structural diagram of a light fixture according to an embodiment of the present disclosure.

As shown in FIG. 2, in this embodiment, the light head is disposed above a case 600, the case 600 is located at the bottom of the light fixture, a support arm 300 is pivotally connected above the case 600, and the heat dissipation assembly 400 is located below the light source driving board 10 for speeding up dissipation of the heat on the light source driving board.

The working principle of this embodiment is that: through a temperature detection circuit, the temperature change of the heat-generating temperature-controlled elements in the light fixture is detected, and the detected temperature rise of the plurality of heat-generating temperature-controlled elements is reported to the single-chip microcomputer through the temperature sensor, then the single-chip microcomputer sends a signal to the heat dissipation assembly to cool down the heat-generating temperature-controlled elements whose temperature rise exceeds a limited value, thereby maintaining the temperature in the circuit constant and extending the service life of the light fixture.

As shown in FIG. 2 and FIG. 3, the reference numeral A is a preferred placement position of the temperature sensors. Generally, there are various design forms of the light fixture, for different design, there are different layout and design of the light source driving boards. The stage light fixture commonly includes a single-light-source stage light fixture as FIG. 3 shown and a multi-light-source light fixture as FIG. 2 shown. The common single-light-source stage light fixture includes only one light source driving board 10, one temperature sensor 20 for the light source driving board 10 and a multi-target temperature detection circuit, the light source driving board 10 is provided with only one light source or one light source module or one LED module. While the multi-light-source light fixture includes a plurality of light source driving boards 10, temperature sensors 20 and a circuit with multi-target temperature detection, each of the light source driving boards 10 is provided with one light source or one light source module or one LED module, and the temperature sensor 20 is closely attached to the respective light source driving board 10 and used for detecting the overall temperature change of the light source driving board 10. According to the present disclosure, the temperature sensors 20 can be placed at a suitable position of any assembly in the light fixture. However, the light source driving board 10 has not only a plurality of light sources, but also circuit elements and the temperature sensors 20, when the light fixture needs to be subjected to temperature detection, the temperature sensor 20 can be pasted to the respective temperature-controlled element to be detected in the light fixture, so that each of the light source driving boards 10 with a plurality of light sources or circuit elements, which is able to be detected, is provided with one of the temperature sensors 20. When such temperature sensor 20 senses a temperature change, the temperature change is an overall temperature change of the light source driving board 10 sensed by the temperature sensor. By directly detecting the overall temperature of the light source driving board 10 in such way, the number of temperature sensors 20 mounted can be greatly reduced, especially for the light fixture model spliced with a plurality of light source driving boards 10, the position of the light source driving board 10 where a temperature change occurs in the light fixture can be efficiently determined. Further temperature detection can be performed manually to determine whether the temperature-controlled elements with overhigh temperature in the light source driving board 10 is a light source or other circuit elements.

As shown in FIGS. 2 and 3, since there are a plurality of temperature-controlled elements on the plurality of light source driving boards 10, in order to prevent from the light source driving board 10 being burnt out due to overheat, the light source driving board 10 is provided with a heat dissipation assembly 400. The heat dissipation assembly 400 may include fins, a heat pipe, and a fan. An air channel is formed between the fins for increasing the heat dissipation area of the light source driving board 10; the heat pipe penetrates through all the fins to connect the fins for homogenizing the heat on the fins, a medium which is easy to cool down can be injected into the heat pipe or a hollow pipe is in the heat pipe to help to conduct heat of the place where the heat is high in the fin to the place where the heat is low, thereby further increasing the heat dissipation speed of the light source driving board 10; the fan is used for increasing the heat dissipation speed of the light source driving board 10. In this case, when the temperature sensor 20 detects the temperature rise of the light source driving board 10, the single-chip microcomputer will send a cooling instruction according to the temperature rise change signal provided by the temperature sensor 20, and then according to an address signal provided by the temperature sensor 20, start the fan near the light source driving board 10 where the temperature rise change signal is detected, and control the start of the fan to perform overall cooling on the light source driving board 10 with the temperature rise change, thus maintaining the overall temperature of the light source driving board 10 within a normal range.

As shown in FIG. 2, eight light source driving boards 10 are defined, and the eight light source driving boards 10 are connected in series to form a long strip spliced light source driving board. However, the light source driving board of the light fixture can be formed by splicing one or two or more light source driving boards, and accordingly, at least one of the temperature sensors 20 is disposed on each of the light source driving boards 10 for detecting the temperature rise change of the light source driving board 10.

The working principle of such multi-light-source light fixture is that: the plurality of light source driving boards are connected in series and spliced as units, and a temperature sensor is disposed on each unit after splicing to detect the overall temperature of each unit, avoiding the complicated design that a plurality of temperature sensors are disposed on each light source driving board, and consequently, a plurality of single-chip microcomputers need to be connected, thus improving the efficiency of temperature detection for the type of multi-light-source light fixture, and reducing the cost of temperature detection for such type light fixture.

According to some embodiments, the temperature sensor 20 can include an infrared probe disposed close to the respective temperature-controlled element. With such configuration, the temperature sensor 20 can rely on the infrared probe with low power consumption and low cost for signal transmission, thereby further reducing the manufacturing cost of the temperature sensor 20 and also further reducing the temperature detection cost of the light fixture.

Obviously, the above-mentioned embodiments of the present disclosure are only examples for clearly illustrating the technical solutions of the present disclosure, rather than limiting the specific implementation modes of the present disclosure. Any modifications, equivalent replacements and improvements made within the spirit and principles of claims of the present disclosure shall be included within the protection scope of the claims of the present disclosure.

The invention claimed is:

1. A light fixture having a multi-target temperature detection circuit, comprising:

a light head, which comprises:

a light source assembly for generating a light path, a light outgoing lens, a plurality of temperature-controlled elements disposed inside the light head, and a plurality of heat dissipation assemblies for dissipating heat from the corresponding temperature-controlled elements;

a single-chip microcomputer; and a plurality of temperature sensors located at various positions inside the light head for detecting temperature of the corresponding temperature-controlled element, which are connected to, via an integrated communication serial port, the single-chip microcomputer in parallel, wherein the plurality of temperature sensors are configured to send corresponding address signals and temperature detection signals thereof to the single-chip microcomputer via the integrated communication serial port, and the single-chip microcomputer is configured to receive and process the temperature detection signals, determine an address of the corresponding temperature-controlled element which sends the temperature detection signal indicating excessive temperature according to the corresponding address signals, and control corresponding heat dissipation assembly close to the address to start up for heat dissipation.

2. The light fixture according to claim 1, wherein the integrated communication serial port is in form of an Inter-Integrated Circuit (I2C) serial port.

3. The light fixture according to claim 2, wherein each of the plurality of temperature sensor comprises:

a thermosensitive unit, which is configured for detecting temperature change of the respective temperature-controlled element; and an analog-to-digital converter (ADC), which is configured for converting the temperature change into a digital signal, the digital signal converted is output to the single-chip microcomputer via the I2C serial port.

4. The light fixture according to claim 1, further comprising at least three jumper resistors connected to each temperature sensor for distinguishing address information of each temperature sensor.

5. The light fixture according to claim 1, wherein each temperature sensor comprises an infrared probe arranged close to the respective temperature-controlled element.

6. The light fixture according to claim 1, wherein at least one of the plurality of temperature sensors is in form of an SGM452 temperature sensor.

7. The light fixture according to claim 1, wherein each temperature sensor has a temperature detection range of −55° C. to 125° C.

8. The light fixture according to claim 1, wherein the temperature-controlled elements include at least one of an MOS transistor, a light source driving board of the light source assembly, a PCB of the effect module, or a PCB of a focusing lens.

9. The light fixture according to claim 1, wherein the light source assembly comprises a light source driving board, and at least one of the plurality of temperature sensors is closely attached to the light source driving board and used for detecting an overall temperature change thereof.

10. The light fixture according to claim 1, wherein the light source assembly comprises a plurality of light source driving boards provided with light-emitting elements, and at least one of the plurality of temperature sensors is closely attached on each of the light source driving boards.

11. The light fixture according to claim 10, wherein the plurality of light source driving boards are respectively provided with a heat dissipation assembly, and the single-chip microcomputer is configured to receive a plurality of temperature detection signals to control a working state of the heat dissipation assembly.

12. The light fixture according to claim 1, wherein the heat dissipation assembly comprises an air blower.

13. The light fixture according to claim 1, further comprising a case and a support arm pivotally connected to the case, and the light head is pivotally connected to an inner side of the support arm, so that the light head is capable of rotating in two dimensions with respect to the case.

14. The light fixture according to claim 1, wherein six jumper resistors are further comprised, with three jumper resistors connected in parallel with each other and having access to a voltage, and other three jumper resistors connected in parallel with each other and connected to a ground wire, and wherein each temperature sensor has three address pins which are respectively connected to three of the jumper resistors.

* * * * *